(12) United States Patent
Aratani et al.

(10) Patent No.: US 11,332,812 B2
(45) Date of Patent: May 17, 2022

(54) ELECTRIC RESISTANCE WELDED STEEL TUBES FOR HIGH-STRENGTH THIN HOLLOW STABILIZERS, AND METHODS FOR MANUFACTURING THE SAME

(71) Applicant: JFE Steel Corporation, Tokyo (JP)

(72) Inventors: Masatoshi Aratani, Tokyo (JP); Shinsaku Kokubo, Tokyo (JP); Hiromichi Hori, Tokyo (JP); Yoshikazu Kawabata, Tokyo (JP); Ryoji Matsui, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 417 days.

(21) Appl. No.: 16/326,420

(22) PCT Filed: Oct. 19, 2017

(86) PCT No.: PCT/JP2017/037824
§ 371 (c)(1),
(2) Date: Feb. 19, 2019

(87) PCT Pub. No.: WO2018/079398
PCT Pub. Date: May 3, 2018

(65) Prior Publication Data
US 2021/0277507 A1    Sep. 9, 2021

(30) Foreign Application Priority Data
Oct. 24, 2016   (JP) .............................. JP2016-207518

(51) Int. Cl.
| | |
|---|---|
| *C22C 38/32* | (2006.01) |
| *C21D 8/02* | (2006.01) |
| *C21D 8/10* | (2006.01) |
| *C22C 38/02* | (2006.01) |
| *C22C 38/06* | (2006.01) |
| *C22C 38/28* | (2006.01) |
| *C22C 38/38* | (2006.01) |
| *C21D 9/08* | (2006.01) |

(52) U.S. Cl.
CPC ............ *C22C 38/32* (2013.01); *C21D 8/0226* (2013.01); *C21D 8/105* (2013.01); *C22C 38/02* (2013.01); *C22C 38/06* (2013.01); *C22C 38/28* (2013.01); *C22C 38/38* (2013.01); *C21D 9/085* (2013.01)

(58) Field of Classification Search
None
See application file for complete search history.

(56) References Cited

U.S. PATENT DOCUMENTS

| | | | |
|---|---|---|---|
| 9,862,014 B2 | 1/2018 | Kawabata et al. | |
| 2013/0160889 A1 | 6/2013 | Aratani et al. | |
| 2015/0176101 A1* | 6/2015 | Ishitsuka | C21D 9/50 148/504 |
| 2018/0305780 A1 | 10/2018 | Aratani et al. | |

FOREIGN PATENT DOCUMENTS

| | | |
|---|---|---|
| CN | 101484602 A | 7/2009 |
| CN | 102822374 A | 12/2012 |
| EP | 1923477 A1 | 5/2008 |
| EP | 2050833 A1 | 4/2009 |
| EP | 2551366 A1 | 1/2013 |
| EP | 2857537 A1 | 4/2015 |
| JP | 57126917 A | 8/1982 |
| JP | 2003201543 A | 7/2003 |
| JP | 2005076047 A | 3/2005 |
| JP | 2006206999 A | 8/2006 |
| JP | 2006312773 A | 11/2006 |
| JP | 2007217736 A | 8/2007 |
| JP | 2007270349 A | 10/2007 |
| JP | 2008208417 A | 9/2008 |
| JP | 2009249650 A | 10/2009 |
| JP | 2010121157 A | 6/2010 |
| JP | 2010189758 A | 9/2010 |
| JP | 2012246550 A | 12/2012 |
| WO | 2013175821 A1 | 11/2013 |
| WO | 2017056384 A1 | 4/2017 |

OTHER PUBLICATIONS

Huo, X., "Rolling Technology Foundation," Oct. 31, 2013, 6 pages with English translation of p. 16.
"Metal Manual," Feb. 29, 1988, 5 pages, American Society of Metals, Mechanical Industry Press, with English translation of p. 173.
LV, M., "Basis of Machine Manufacturing Technology," Aug. 31, 2010, 7 pages, with English translation of p. 256.
Extended European Search Report for European Application No. 17 865 860.5, dated May 17, 2019, 11 pages.
Korean Office Action for Korean Application No. 10-2019-7004861, dated Jun. 22, 2020, with Concise Statement of Relevance of Office Action, 8 pages.
Chinese Office Action with Search Report for Chinese Application No. 201780051092.8, dated Apr. 15, 2020, 9 pages.
Chinese Office Action with Search Report for Chinese Application No. 201780051092.8, dated Oct. 23, 2020, 9 pages.

(Continued)

*Primary Examiner* — Daniel J. Schleis
(74) *Attorney, Agent, or Firm* — RatnerPrestia

(57) ABSTRACT

A method for manufacturing an electric resistance welded steel tube for high-strength thin hollow stabilizers is provided. A steel with a certain chemical composition is heated to a temperature of 1000 to 1300° C., hot rolled under conditions where the rolling finish temperature is 750 to 950° C., cooled, coiled into a coil at 500 to 650° C., and skin pass rolled with a rolling reduction ratio of not less than 0.3%. The resultant hot rolled sheet is electric resistance welded into an electric resistance welded steel tube, which is then reheated to a temperature of 800 to 1100° C. and hot stretch-reducing rolled under conditions where the rolling finish temperature is not more than 850° C. and the cumulative diameter reduction is not more than 75%. Consequently, a thin electric resistance welded steel tube is produced.

8 Claims, No Drawings

(56) References Cited

OTHER PUBLICATIONS

Chinese Office Action for Chinese Application No. 201780051092.8, dated Apr. 8, 2021, with Concise Statement of Relevance of Office Action, 7 pages.
International Search Report and Written Opinion for International Application No. PCT/JP2017/037824, dated Jan. 23, 2018—6 pages.

* cited by examiner

ELECTRIC RESISTANCE WELDED STEEL TUBES FOR HIGH-STRENGTH THIN HOLLOW STABILIZERS, AND METHODS FOR MANUFACTURING THE SAME

CROSS REFERENCE TO RELATED APPLICATIONS

This is the U.S. National Phase application of PCT/JP2017/037824, filed Oct. 19, 2017, which claims priority to Japanese Patent Application No. 2016-207518, filed Oct. 24, 2016, the disclosures of these applications being incorporated herein by reference in their entireties for all purposes.

FIELD OF THE INVENTION

The present invention relates to an electric resistance welded steel tube suited for automobile stabilizers, in particular, to an electric resistance welded steel tube for high-strength thin hollow stabilizers with enhanced fatigue resistance, and to a method for manufacturing such electric resistance welded steel tubes for high-strength thin hollow stabilizers. Here, the term "thin" means that the wall thickness t is not more than 6 mm and the ratio t/D of the wall thickness t (mm) to the outer diameter D (mm) is not more than 0.2.

BACKGROUND OF THE INVENTION

Most automobiles are conventionally equipped with stabilizers which reduce the body rolling during cornering and ensure running stability during high-speed maneuvering. From the point of view of global environment preservation, recent automobile bodies are becoming more lightweight to meet demands for enhanced fuel efficiency of automobiles. To make automobile bodies more lightweight, stabilizers which constitute automobiles are generally hollow by the use of steel tubes.

Such hollow stabilizers are usually produced by cold forming a seamless steel tube or an electric resistance welded steel tube into the desired shape, and subjecting the material to refining treatment such as quenching, or quenching and tempering. In particular, electric resistance welded steel tubes are widely used as hollow stabilizer materials on account of their being relatively inexpensive and having good dimensional accuracy.

For example, Patent Literature 1 describes a method for manufacturing hollow stabilizers having excellent fatigue resistance. According to the technique described in Patent Literature 1, a welded steel tube having a chemical composition including, in mass %, C: 0.2 to 0.38%, Si: not more than 0.35%, Mn: 0.3 to 1.5%, Al: not more than 0.1%, Ti: 0.005 to 0.1%, and B: 0.0005 to 0.005%, is subjected to heat treatment in which it is heated to a temperature preferably in the range of 800 to 1000° C., and thereafter the steel tube is stretch-reducing rolled at a rolling temperature of 600 to 850° C. with a cumulative diameter reduction ratio of not less than 40%, and is further processed by cold bending into a stabilizer shape. After this forming process, a heat, treatment process is performed in which the hollow stabilizer is quenched and tempered. According to the technique described in Patent Literature 1, the method is an inexpensive approach to enhancing fatigue resistance.

Patent Literature 2 describes a steel tube for high-strength hollow stabilizers. The steel tube of Patent Literature 2 is an electric resistance welded steel tube for high-strength hollow stabilizers which has a chemical composition including, in mass %, C: 0.20 to 0.38%, Si: 0.10 to 0.50%, Mn: 0.30 to 2.00%, Al: 0.01 to 0.10%, W: 0.01 to 1.50%, and B: 0.0005 to 0.0050%, and further including Ti and N at 0.001 to 0.04% for Ti and 0.0010 to 0.0100% for N while satisfying N/14<Ti/47.9, and which exhibits an excellent balance between strength and toughness after quenching, or quenching and tempering. Patent Literature 2 describes that the technique can easily produce hollow stabilizers which exhibit a high hardness of above 400 HV and have an excellent strength-toughness balance, thus outperforming the conventional products.

Patent Literature 3 describes a highly flattenable electric resistance welded steel tube for heat treatment which has a chemical composition including, in mass %, C: 0.15 to 0.40%, Si: 0.05 to 0.50%, Mn: 0.30 to 2.00%, Al: 0.01 to 0.10%, Ti: 0.001 to 0.04%, B: 0.0005 to 0.0050%, and N: 0.0010 to 0.0100%, with the contents of Ti and N satisfying (N/14)<(Ti/47.9), and which has a bond width in the electric resistance weld of not more than 25 μm. For the production of such electric resistance welded steel tubes, this literature describes a method for manufacturing highly flattenable electric resistance welded steel tubes for heat treatment in which a steel tube material having the above-described chemical composition is formed into a substantially cylindrical open tube, the abutting ends of the open tube are electric resistance welded together by high-frequency resistance welding while controlling the heat input so that the bond width will be 30 to 65 μm, and the resultant electric resistance welded steel tube is heated to a temperature of not less than Ac3 transformation point and is stretch-reduced with an outer diameter reduction of (1-25/bond width (μm) before stretch-reducing rolling)×100% or above to bring the bond width to 25 μm or less. According to Patent Literature 3, electric resistance welded steel tubes obtained by the above production method are suited for applications such as hollow stabilizers where the steel tubes are quenched. The electric resistance welded steel tubes described in Patent Literature 3 have a narrow low-carbon layer in the electric resistance weld. Due to this fact, the quench hardness of the electric resistance weld is not significantly lowered even when the hardening treatment is performed by rapid and quick heating, and the electric resistance welded steel tubes can be formed as highly durable hollow stabilizers.

Patent Literature 4 describes a method for manufacturing steel tubes with excellent fatigue strength in which a solid carburizing agent including 1 to 20 mass % of an alkali metal carbonate and the balance of one, or two or more of charcoal, graphite, coal and coke, and inevitable impurities, is inserted into a steel tube in an amount of not less than 0.05 μg per 1 $mm^2$ surface area of the inner surface of the tube, the steel tube preferably having a chemical composition including, in mass %, C: 0.15 to 0.5%, Si: 0.1 to 0.4%, Mn: 0.3 to 2.0%, Ti: 0.005 to 0.05%, Al: 0.005 to 0.05%, B: 0.0005 to 0.0050%, and N: 0.001 to 0.006%, the both ends of the tube are plugged, and the steel tube is inductively heated and hot stretch-reducing rolled. According to the technique described in Patent Literature 4, the tube is hot stretch-reduced while the solid carburizing agent is attached to the inner surface of the tube. In this manner, the formation of a decarburized layer on the inner surface can be prevented, and fatigue strength is increased. Such steel tubes with excellent fatigue strength are described to be suited as materials for hollow stabilizers and the like.

PATENT LITERATURE

PTL 1: Japanese Unexamined Patent Application Publication No. 2005-076047

PTL 2: Japanese Unexamined Patent Application Publication No. 2006-206999

PTL 3: Japanese Unexamined Patent Application Publication No. 2008-208417

PTL 4: Japanese Unexamined Patent Application Publication No. 2010-189758

SUMMARY OF THE INVENTION

The recent demand for further weight reduction of automobile bodies has accelerated strengthening and thinning of hollow stabilizers which constitute automobile bodies. As a result, there has been a request for thin electric resistance welded steel tubes for hollow stabilizers which can keep excellent fatigue resistance after being formed into stabilizers and heat treated. Here, the term "thin" electric resistance welded steel tube means that the electric resistance welded steel tube has a wall thickness t of not more than 6 mm and a ratio t/D of the wall thickness t (mm) to the outer diameter D (mm) of not more than 0.2.

However, Patent Literatures 1 to 4 do not refer to "thin" steel tubes addressed in accordance with aspects of the present invention or the fatigue resistance of such "thin" steel tubes. The techniques described in Patent Literatures 1 to 4 are incapable of producing thin steel tubes having superior fatigue resistance (torsional fatigue resistance).

Aspects of the present invention are directed to solving the problems in the art discussed above. Objects according to aspects of the present invention are to provide an electric resistance welded steel tube for high-strength thin hollow stabilizers which has a wall thickness t of not more than 6 mm and a ratio t/D of not more than 0.2 wherein D is the outer diameter of the steel tube and which exhibits excellent fatigue resistance after being formed into a stabilizer and heat treated, and to provide a method for manufacturing such electric resistance welded steel tubes.

Here, the term "high-strength" means that the average hardness in wall thickness direction expressed in Vickers hardness is not less than 450 HV as measured after the steel tube is formed into a stabilizer and is subjected to quenching and tempering treatment. In the "quenching and tempering treatment", the steel tube is heated to a quenching heating temperature of 850 to 1000° C. and is then rapidly cooled by being soaked into a coolant such as water or quenching oil, and the steel tube resulting from the quenching treatment is tempered at a tempering temperature for a holding time which are selected appropriately to attain the high strength (Vickers hardness HV) described above, the tempering being followed by air cooling.

Here, the phrase "excellent fatigue resistance" means that the fatigue strength after $10^6$ times of stress application in a torsional fatigue test under completely reversed stress in accordance with JIS Z 2273 is not less than 450 MPa.

To achieve the objects described above, the present inventors have carried out extensive studies on factors which would affect the fatigue resistance of thin steel tubes. As a result, the present inventors have reached a conclusion that the quality of the inner surface of the tube is the most important factor that should be enhanced.

When a thin hollow stabilizer (a thin steel tube) is being used, the inner and outer surfaces of the tube are subjected to similar stress. If the outer surface has been shot blasted and strengthened exclusively so that the outer side is hardened and has a residual compressive stress, the inner surface of the tube has a risk of cracks during the use of the steel tube under the above circumstance. Enhancing the quality of the tube inner surface is critical in order to prevent the generation of cracks on the inner surface of the tube and to enhance fatigue resistance.

An approach that will be effective for enhancing the quality of the tube inner surface is cold drawing, which however involves complicated processes and raises the production costs.

The present inventors then carried out further studies, and have found that the quality of the tube inner surface such as a decarburized layer on the tube inner surface, the surface roughness of the tube inner surface and the flatness of a bent portion has significant influences on the fatigue resistance of thin hollow stabilizers (thin steel tubes). If a decarburized layer is present on the tube inner surface, the vicinity of the inner surface is not sufficiently hardened by quenching treatment and is prone to plastic deformation, thus serving as origins of fatigue cracks. To enhance fatigue resistance, it is therefore preferable that there be as little decarburized layer as possible on the tube inner surface. The present inventors have found that the development of fatigue cracks can be suppressed when the depth of a decarburized layer is 120 μm or less from the tube inner surface. Thus, in accordance with aspects of the present invention, the depth of a decarburized layer in wall thickness direction is limited to not more than 120 μm from the tube inner surface. The depth of a decarburized layer is desirably not more than 50 μm from the tube inner surface, and is more desirably not more than 30 μm from the tube inner surface.

If the tube inner surface has a high surface roughness and has wrinkles, the tube inner surface contains an increased amount of valleys to which a stress will concentrate and which consequently can serve as origins of fatigue cracks. Thus, reducing the surface roughness is preferable in order to enhance fatigue resistance. The present inventors have found that the development of fatigue cracks from the tube inner surface can be suppressed when the surface roughness Ra of the tube inner surface is 0.01 to 5.0 μm. Thus, in accordance with aspects of the present invention, the surface roughness Ra of the tube inner surface is limited to 0.01 to 5.0 μm. The surface roughness Ra of the tube inner surface is desirably not more than 2.0 μm, and is desirably not less than 0.07 μm.

If a bent portion of a hollow stabilizer has a large flatness, a stress will be concentrated to the small curvature radius portion after repeated application of load during the use of the hollow stabilizer, and consequently poor durability can be experienced. The present inventors have then found that the yield ratio should be, increased in order to ensure that a bent portion will not have an excessively large flatness. After further studies, the present inventors have found that when the yield ratio of an electric resistance welded steel tube is 65% or above, a bent portion is not flattened to such an extent that poor durability will be incurred.

Aspects of the present invention have been completed after further studies based on the findings described above. A summary of aspects of the present invention is as described below.

(1) A method for manufacturing an electric resistance welded steel tube for high-strength thin hollow stabilizers, comprising heating, hot rolling and skin pass rolling processes where a steel is formed into a hot rolled sheet, a tube making process by an electric resistance welding is applied to the hot rolled sheet as a steel tube material into an electric resistance welded steel tube, and a hot stretch-reducing rolling process is applied to the reheated and hot stretch-reducing rolled electric resistance welded steel tube, making a product tube having a reduced diameter, wherein the steel has a chemical composition comprising, in mass %, C: 0.20 to 0.40%, Si: 0.1 to 1.0%, Mn: 0.1 to 2.0%, P: not more than 0.1%, S: not more than 0.01%, Al: 0.01 to 0.10%, Cr: 0.01 to 1.0%, Ti: 0.01 to 0.05%, B: 0.0005 to 0.0050%, Ca: 0.0001 to 0.0050%, and N: not more than 0.010%, the balance being Fe and inevitable impurities, the heating process for the steel comprises heating the steel to a heating temperature in the range of 1000 to 1300° C., the hot rolling process comprises hot rolling the steel under conditions where the rolling finish temperature is 750 to 950° C., cooling the steel sheet, and coiling the steel sheet into a coil at a coiling temperature of 500 to 650° C., the skin pass rolling process comprises skin pass rolling the steel sheet with a rolling reduction ratio of not less than 0.3%, the hot stretch-reducing rolling process comprises reheating the electric resistance welded steel tube to a heating temperature of 800 to 1100° C., and hot stretch-reducing rolling the electric resistance welded steel tube to a reduced diameter under conditions where the rolling finish temperature is not more than 850° C. and the cumulative diameter reduction ratio is not more than 75%, the product tube has a depth of a decarburized layer in wall thickness direction on the tube inner surface of not more than 120 μm from the surface, the product tube has a surface roughness Ra of the tube inner surface of 0.01 to 5.0 μm, the product tube has a yield ratio of not less than 65%, the product tube has a hardness expressed in Vickers hardness of not less than 450 HV as measured after the steel tube is formed into a stabilizer and is subjected to quenching and tempering treatment, and the product tube has a wall thickness t of not more than 6 mm and a ratio t/D of the wall thickness t (mm) to the outer diameter D (mm) of not more than 0.2 and exhibits excellent fatigue resistance after being formed into a stabilizer and subjected to quenching and tempering treatment.

(2) The method for manufacturing an electric resistance welded steel tube for high-strength thin hollow stabilizers described in (1), wherein the hardness expressed in Vickers hardness is less than 550 HV as measured after the steel tube is formed into a stabilizer and is subjected to quenching and tempering treatment.

(3) The method for manufacturing an electric resistance welded steel tube for high-strength thin hollow stabilizers described in (1) or (2), wherein the chemical composition further comprises, in mass %, one or two selected from Cu: not more than 1% and Ni: not more than 1%.

(4) The method for manufacturing an electric resistance welded steel tube for high-strength thin hollow stabilizers described in any one of (1) to (3), wherein the chemical composition further comprises, in mass %, one, or two or more selected from Nb: not more than 0.05%, W: not more than 0.05%, and V: not more than 0.5%.

(5) The method for manufacturing an electric resistance welded steel tube for high-strength thin hollow stabilizers described in any one of (1) to (4), wherein the chemical composition further comprises, in mass %, REM: not more than 0.02%.

(6) An electric resistance welded steel tube for high-strength thin hollow stabilizers manufactured by hot stretch-reducing rolling an electric resistance welded steel tube of a hot rolled steel sheet, wherein the electric resistance welded steel tube has a chemical composition comprising, in mass %, C: 0.20 to 0.40%, Si: 0.1 to 1.0%, Mn: 0.1 to 2.0%, P: not more than 0.1%, S: not more than 0.01%, Al: 0.01 to 0.10%, Cr: 0.01 to 1.0%, Ti: 0.01 to 0.05%, B: 0.0005 to 0.0050%, Ca: 0.0001 to 0.0050%, and N: not more than 0.010%, the balance being Fe and inevitable impurities, the depth of a decarburized layer in wall thickness direction on the tube inner surface is not more than 120 μm from the surface, the surface roughness Ra of the tube inner surface is 0.01 to 5.0 μm, the yield ratio is not less than 65%, the hardness expressed in Vickers hardness is not less than 450 HV as measured after the steel tube is formed into a stabilizer and is subjected to quenching and tempering treatment, and the electric resistance welded steel tube has a wall thickness t of not more than 6 mm and a ratio t/D of the wall thickness t (mm) to the outer diameter D (mm) of not more than 0.2 and exhibits excellent fatigue resistance after being formed into a stabilizer and subjected to quenching and tempering treatment.

(7) The electric resistance welded steel tube for high-strength thin hollow stabilizers described in (6), wherein the hardness expressed in Vickers hardness is less than 550 HV as measured after the steel tube is formed into a stabilizer and is subjected to quenching and tempering treatment.

(8) The electric resistance welded steel tube for high-strength thin hollow stabilizers described in (6) or (7), wherein the chemical composition further comprises, in mass %, one or two selected from Cu: not more than 1% and Ni: not more than 1%.

(9) The electric resistance welded steel tube for high-strength thin hollow stabilizers described in any one of (6) to (8), wherein the chemical composition further comprises, in mass %, one, or two or more selected from Nb: not more than 0.05%, W: not more than 0.05%, and V: not more than 0.5%.

(10) The electric resistance welded steel tube for high-strength thin hollow stabilizers described in any one of (6) to (9), wherein the chemical composition further comprises, in mass %, REM: not more than 0.02%.

Aspects of the present invention allow for easy manufacturing of an electric resistance welded steel tube for high-strength thin hollow stabilizers which has a hardness expressed in Vickers hardness of not less than 450 HV and less than 550 HV as measured after the steel tube is formed into a stabilizer and is subjected to quenching and tempering treatment, and which has a wall thickness t of not more than 6 mm and a ratio t/D of the wall thickness t (mm) to the outer diameter D (mm) of not more than 0.2 and exhibits excellent fatigue resistance after being formed into a stabilizer and subjected to quenching and tempering treatment. In addition to this marked advantage in industry, aspects of the present invention also make it possible to attain further reduction in the weight of automobile bodies.

DETAILED DESCRIPTION OF EMBODIMENTS OF THE INVENTION

An electric resistance welded steel tube for high-strength thin hollow stabilizers according to aspects of the present invention is an electric resistance welded steel tube obtained by hot stretch-reducing rolling an electric resistance welded steel tube of a hot rolled steel sheet, that is, an electric resistance welded steel tube resulting from electric welding of a hot rolled steel sheet. Here, the phrase "electric resistance welded steel tube obtained by hot stretch-reducing" means that the electric resistance welded steel tube has been hot stretch-reducing rolled to a reduced diameter. Because defining an electric resistance welded steel tube after hot stretch-reducing rolling by its characteristics and structure entails enormous labor and is not practical, the electric resistance welded steel tube is simply described as having been hot stretch-reducing rolled to a reduced diameter.

First, a method for manufacturing a hot rolled steel sheet used in accordance with aspects of the present invention will be described.

A steel is sequentially subjected to a heating process, a hot rolling process and a skin pass rolling process and is formed into a hot rolled sheet (a hot rolled steel sheet).

The steel that is used has a chemical composition including, in mass %, C: 0.20 to 0.40%, Si: 0.1 to 1.0%, Mn: 0.1 to 2.0%, P: not more than 0.1%, S: not more than 0.01%, Al: 0.01 to 0.10%, Cr: 0.01 to 1.0%, Ti: 0.01 to 0.05%, B: 0.0005 to 0.0050%, Ca: 0.0001 to 0.0050%, and N: not more than 0.010%, or further including one or two selected from Cu: not more than 1% and Ni: not more than 1%, and/or one, or two or more selected from Nb: not more than 0.05%, W: not more than 0.05%, and V: not more than 0.5%, and/or REM: not more than 0.02%, the balance being Fe and inevitable impurities.

Next, the reasons why the chemical composition of the steel is thus limited will be explained. Hereinbelow, mass % in the chemical composition will be simply written as % unless otherwise mentioned.

C: 0.20 to 0.40%

Carbon offers enhanced hardenability and thereby promotes martensite formation. Further, carbon is dissolved to increase the strength (hardness) of steel and is an important element for the strengthening of hollow stabilizers. In accordance with aspects of the present invention, 0.20% or more carbon is necessary in order to ensure high strength (high hardness). If more than 0.40% carbon is contained, toughness after quenching treatment is decreased. Thus, the C content is limited to the range of 0.20 to 0.40%. The C content is preferably not less than 0.22% and not more than 0.38%, and more preferably not less than 0.24% and not more than 0.37%.

Si: 0.1 to 1.0%

Silicon acts as a deoxidizes and also as a solid solution strengthening element. To obtain these effects, the Si content needs to be 0.1% or more. If more than 1.0% silicon is contained, hardenability is decreased. Thus, the Si content is limited to the range of 0.1 to 1.0%. The Si content is preferably not less than 0.12% and not more than 0.5%, and more preferably not less than 0.15% and not more than 0.3%.

Mn: 0.1 to 2.0%

Manganese is an element that is dissolved to contribute to increasing the strength of steel and also enhances the hardenability of steel. In accordance with aspects of the present invention, the Mn content needs to be 0.1% or more in order to ensure the desired high strength (high hardness). If more than 2.0% manganese is contained, the amount of retained austenite is so increased that toughness after tempering treatment is decreased. Thus, the Mn content is limited to the range of 0.1 to 2.0%. The Mn content is preferably not less than 0.3% and not more than 1.7%, and more preferably not less than 0.4%.

P: not more than 0.1%

Phosphorus is an element that exists as an impurity and is segregated at grain boundaries and the like to adversely affect weld cracking properties and toughness. For use as hollow stabilizers, the P content needs to be lowered to 0.1% or less. The P content is preferably not more than 0.05%. Lowering the P content more than necessary may cause a decrease in strength and may raise the production costs. Thus, the P content is preferably not less than 0.001%.

S: not more than 0.01%

Sulfur is an element that exists in steel as sulfide inclusions and causes decreases in hot workability, toughness and fatigue resistance. For use as hollow stabilizers, the S content needs to be lowered to 0.01% or less. The S content is preferably not more than 0.005%. Lowering the S content more than necessary may raise the production costs. Thus, the S content is preferably not less than 0.0001%.

Al: 0.01 to 0.10%

Aluminum acts as a deoxidizer and also effectively ensures, by bonding to nitrogen, an amount of solute boron that is effective for enhancing hardenability. Further, aluminum is precipitated as AlN which effectively prevents the coarsening of austenite grains during quench heating. To obtain these effects, the Al content needs to be 0.01% or more. If more than 0.10% aluminum is contained, the amount of oxide inclusions is so increased that the fatigue life may be decreased. Thus, the Al content is limited to the range of 0.01 to 0.10%. The Al content is preferably not less than 0.015% and not more than 0.05%, and more preferably not less than 0.02% and not more than 0.045%.

Cr: 0.01 to 1.0%

Chromium is an element that enhances the hardenability of steel and contributes to enhancing corrosion resistance. To obtain these effects, the Cr content needs to be 0.01% or more. Adding more than 1.0% chromium results in saturated effects and is economically disadvantageous because the effects that are obtained cannot be expected to match the content, and also results in a decrease in electric resistance weldability. Thus, the Cr content is limited to the range of 0.01 to 1.0%. The Cr content is preferably not less than 0.10% and not more than 0.8%, and more preferably not less than 0.12% and not more than 0.5%.

Ti: 0.01 to 0.05%

Titanium bonds to nitrogen to effectively ensure an amount of solute boron that is effective for enhancing hardenability. Further, titanium is precipitated as fine carbide and contributes to the size reduction of austenite grains during heat treatment such as quenching, thus contributing to enhancing fatigue resistance. To obtain these effects, the Ti content needs to be 0.01% or more. Adding more than 0.05% titanium increases the amount of inclusions and results in a decrease in toughness. Thus, the Ti content is limited to the range of 0.01 to 0.05%. The Ti content is preferably not less than 0.011% and not more than 0.04%, and more preferably not less than 0.012% and not more than 0.038%.

B: 0.0005 to 0.0050%

Boron is an effective element that enhances the hardenability of steel at a minute amount. Further, boron acts to strengthen grain boundaries, and suppresses grain boundary embrittlement due to phosphorus segregation. To obtain these effects, the B content needs to be 0.0005% or more. Adding more than 0.0050% boron results in saturated effects and is economically disadvantageous. Thus, the B content is limited to the range of 0.0005 to 0.0050%. The B content is preferably not less than 0.0008% and not more than 0.0030%, and more preferably not less than 0.0010% and not more than 0.0025%.

Ca: 0.0001 to 0.0050%

Calcium is an element that acts to control the form of sulfide inclusions to substantially spherical fine inclusions. To obtain this effect, the Ca content needs to be 0.0001% or more. If more than 0.0050% calcium is contained, the amount of inclusions is so increased that fatigue resistance is decreased. Thus, the Ca content is limited to the range of 0.0001 to 0.0050%. The Ca content is preferably not less than 0.0005% and not more than 0.0030%.

N: not more than 0.010%

Nitrogen is an element that is contained inevitably in steel. This element bonds to nitride-forming elements in steel to contribute to suppressing the coarsening of crystal grains and to increasing the strength after tempering. If, however, more than 0.010% nitrogen is contained, the toughness of electric resistance welds is decreased. Thus, the N content is limited to not more than 0.010%. The N content is preferably not more than 0.0050%, and more preferably not less than 0.0005% and not more than 0.0040%.

The elements described above are the basic components. In accordance with aspects of the present invention, the chemical composition may further include, in addition to the basic components, an optional element(s) as required which includes one or two selected from Cu: not more than 1% and Ni: not more than 1%, and/or one, or two or more selected from Nb: not more than 0.05%, W: not more than 0.05%, and V: not more than 0.5%, and/or REM: not more than 0.02%.

One or two selected from Cu: not more than 1% and Ni: not more than 1%

Copper and nickel are elements which enhance hardenability and corrosion resistance, and may be selectively added as required. To obtain the above effects, the Cu content needs to be not less than 0.01% and the Ni content not less than 0.01%. Because copper and nickel are both expensive, adding more than 1% copper or more than 1% nickel raises the material costs. Thus, the contents of copper and nickel, if contained, are preferably limited to not more than 1% copper and not more than 1% nickel. More preferably, the Cu content is 0.1 to 0.5% and the Ni content is 0.1 to 0.5%.

One, or two or more selected from Nb: not more than 0.05%, W: not more than 0.05%, and V: not more than 0.5%

Niobium, tungsten and vanadium are elements which form fine carbides and contribute to increasing the strength (hardness), and may be added selectively as required. To obtain these effects, their contents are desirably Nb: not less than 0.001%, W: not less than 0.01%, and V: not less than 0.01%. Adding more than 0.05% niobium, more than 0.05% tungsten, or more than 0.5% vanadium results in saturated effects and is economically disadvantageous because the effects that are obtained cannot be expected to match the contents; in this case, further, carbides tend to be coarsened and toughness is adversely affected. Thus, the contents of niobium, tungsten and vanadium, if contained, are preferably limited to Nb: not more than 0.05%, W: not more than 0.05%, and V: not more than 0.5%. Their contents are more preferably Nb: 0.001 to 0.03%, W: 0.01 to 0.03%, and V: 0.01 to 0.3%.

REM: not more than 0.02%

Similarly to calcium, REM is an element that acts to control the form of sulfide inclusions to substantially spherical fine inclusions. To complement the action of calcium, it is preferable in accordance with aspects of the present invention that 0.0005% or more REM be contained. If the REM content exceeds 0.02%, the amount of inclusions is so increased that ductility and toughness are lowered. Thus, the content of REM, if contained, is preferably limited to not more than 0.02%. The REM content is more preferably 0.001 to 0.01%.

The balance after the deduction of the above components is iron and inevitable impurities. The content of oxygen (O) as an inevitable impurity is preferably controlled to not more than 0.005%. The reason why the oxygen (O) content is preferably controlled to not more than 0.005% is because in steel, oxygen exists as oxide inclusions and deteriorates characteristics such as workability, toughness and fatigue resistance. The 0 content is more preferably not more than 0.002%.

In accordance with aspects of the present invention, the steel may be produced by any common method without limitation. From the point of view of productivity, a preferred steel production process is such that a molten steel having the chemical composition described above is smelted in a common smelting furnace such as a converter or an electric furnace, and is cast by a usual method such as continuous casting to form a strand (a steel) such as a slab. Alternatively, the billet (the steel) may be produced by ingot making-blooming.

The steel obtained is first subjected to a heating process.

In the heating process, the steel is heated to a heating temperature in the range of 1000 to 1300° C.

If the heating temperature is below 1000° C., precipitates such as carbides which have occurred during the casting process cannot be dissolved completely, and the desired high strength (high hardness) cannot be ensured. If the heating temperature exceeds 1300° C., the crystal grains are significantly coarsened and the desired fatigue resistance cannot be ensured. Thus, the heating temperature in the heating process is limited to the range of 1000 to 1300° C. The heating temperature is preferably 1100 to 1250° C.

The steel that has been heated is then subjected to a hot rolling process.

In the hot rolling process, the steel is hot rolled under conditions where the rolling finish temperature is in the range of 750 to 950° C., thus forming a hot rolled sheet with a predetermined size.

Rolling finish temperature: 750° C. to 950° C.

If the rolling finish temperature is below 750° C., the hot rolled sheet becomes rigid and is deteriorated in workability. If the rolling finish temperature is above 950° C., the surface skin is roughened and the surface is significantly decarburized. Thus, the rolling finish temperature in the hot rolling process is limited to the range of 750 to 950° C. The rolling finish temperature is preferably 800 to 880° C. By controlling the rolling finish temperature to fall in the above temperature range, pearlite transformation is allowed to complete during cooling after the rolling, and no pearlite transformation occurs after coiling of the thin steel sheet of interest in accordance with aspects of the present invention. If pearlite transformation occurs after coiling, the heat from the exothermic pearlite transformation causes the hot rolled sheet to be held at high temperatures for a long time, and thus allows decarburization to proceed on the sheet surface. From these facts, the thickness of a decarburized layer on the inner surface of the electric resistance welded steel tube can be reduced by ensuring that as much pearlite transformation as possible will take place on the run-out table before the coiling process.

In the hot rolling process, after the completion of rolling, the hot rolled sheet is cooled and is coiled into a coil at a coiling temperature of 500 to 650° C. If the coiling temperature is lower than the above temperature range, the hot rolled sheet becomes hardened and is deteriorated in workability. If the coiling temperature is higher than the above temperature range, the surface is significantly decarburized and the fatigue resistance is lowered. Thus, the coiling temperature is limited to the range of 500 to 650° C. The coiling temperature is preferably 500 to 620° C.

The hot rolled sheet obtained is then subjected to a skin pass rolling process.

In accordance with aspects of the present invention, the skin pass rolling process may be preceded by a sheet pickling process in which the hot rolled sheet is pickled to remove oxide scales on the surface. If oxide scales remain on the sheet surface, a decarburized layer may be formed during the downstream heating and rolling processes. The pickling liquid is preferably hydrochloric acid or sulfuric acid which is usual pickling liquids, or a mixture thereof.

In the skin pass rolling process, the hot rolled sheet, preferably after the sheet pickling process, is skin pass rolled with a rolling reduction ratio of not less than 0.3%. The skin pass rolling collapses and reduces the thickness of the decarburized layer which has been formed on the surface of the hot rolled sheet, and also improves the surface roughness of the sheet surface. If the rolling reduction ratio is less than 0.3%, the decarburized layer is not sufficiently reduced in thickness and the surface roughness Ra cannot be brought to 5.0 μm or less. Thus, the skin pass rolling reduction ratio is limited to not less than 0.3%. If the skin pass rolling reduction ratio is more than 1.5%, the rolling load is excessively increased. Thus, the skin pass rolling reduction ratio is preferably not more than 1.5%. The skin pass rolling reduction ratio is preferably 0.3 to 1.0%.

The hot rolled steel sheet (the hot rolled sheet) obtained by the processes described above is used as a steel tube material, and is subjected to a tube making process by an electric resistance welding process in which the steel tube material is electric resistance welded into an electric resistance welded steel tube. The tube electric resistance welding process is preferably performed, although not particularly limited to, in such a manner that the hot rolled steel sheet (the steel tube material) is cold formed into a substantially cylindrical open tube by being passed continuously through a plurality of rolls, and the circumferential ends of the open tube are pressed together and electric resistance welded together by electrical welding.

In accordance with aspects of the present invention, the electric resistance welded steel tube obtained is further subjected to a hot stretch-reducing rolling process.

In the hot stretch-reducing rolling process, the electric resistance welded steel tube is reheated to a heating temperature of 800 to 1100° C., and is stretch-rolled to a reduced diameter under conditions where the rolling finish temperature is not more than 850° C. and the cumulative diameter reduction is not more than 75%.

The hot stretch-reducing rolling process in accordance with aspects of the present invention serves to bring the steel tube to the desired product size and to ensure high workability and uniform hardenability. The hot stretch-reducing rolling treatment makes the width of the weld, in which carbon content is lower than that in the mother tube, narrower, and equalizes the hardenability of the steel tube. To ensure these results, the reheating temperature is limited to the range of 800 to 1100° C., and the rolling finish temperature of the stretch-reducing rolling is limited to not more than 850° C.

If the reheating temperature is outside the above reheating temperature range and is below 800° C., the weld is not sufficiently recarburized and hardenability is lowered. If the reheating temperature is above 1100° C., the surface is significantly decarburized and the surface hardness after quenching treatment is lowered. The reheating temperature is preferably not less than 900° C. and not more than 1050° C.

If the rolling finish temperature in the stretch-reducing rolling is above 850° C., the steel stays for an extended time when passing the a plus y two-phase region and ferrite decarburization proceeds, and further the steel fails to attain a yield ratio of not less than 65% and an increased sectional flatness at a bent portion, thus exhibiting poor fatigue resistance. By controlling the rolling finish temperature in the stretch-reducing rolling to not more than 850° C., the amount of passing time in the two-phase region can be shortened utilizing heat release by contact with the rolling rolls, and the progress of ferrite decarburization can be retarded. From these viewpoints, the rolling finish temperature in the stretch-reducing rolling is limited to not more than 850° C. The rolling finish temperature in the stretch-reducing rolling is preferably not more than 845° C. If the rolling finish temperature in the stretch-reducing rolling is below 600° C., the material becomes hard and poorly workable. Thus, the rolling finish temperature in the stretch-reducing rolling is preferably limited to not less than 600° C. The rolling finish temperature in the stretch-reducing rolling is more preferably not less than 700° C.

If the steel tube is stretched with more than 75% cumulative diameter reduction, wrinkles are markedly generated on the tube inner surface and fatigue resistance is lowered. Thus, the cumulative diameter reduction is limited to not more than 75%. If the cumulative diameter reduction is less than 35%, the target strength in accordance with aspects of the present invention cannot be obtained. Thus, the cumulative diameter reduction is preferably not less than 35%. The cumulative diameter reduction is preferably 35 to 72%. More preferably, the cumulative diameter reduction is not less than 45% and not more than 71%.

In accordance with aspects of the present invention, a tube pickling process may be performed after the hot stretch-reducing rolling process. The tube pickling process removes scales on the tube surface, in particular, the tube inner surface. The pickling liquid is preferably hydrochloric acid or sulfuric acid which is usual pickling liquids, or a mixture thereof.

The electric resistance welded steel tube resulting from the above-described processes has a chemical composition described hereinabove, has a decarburized layer extending not more than 120 μm in wall thickness direction from the tube inner surface, has a surface roughness Ra of the tube inner surface in circumferential direction of 0.01 to 5.0 μm, bears less wrinkles on the inner surface, and has a yield ratio of not less than 65%.

If the yield ratio is less than 65%, when the electric resistance welded steel tube is processed by bending, a sectional flatness increases at the bent portion, and durability is deteriorated when it is used as a hollow stabilizer. The electric resistance welded steel tube according to aspects of the present invention, by virtue of its having a yield ratio of not less than 65%, has a small sectional flatness at the bent portion and suffers no decrease in durability when used as a hollow stabilizer. The yield ratio is preferably not less than 66%. If the yield ratio is more than 90%, workability is deteriorated and a difficulty may be encountered in forming the steel tube into a stabilizer. Thus, the yield ratio is preferably not more than 90%. The yield ratio is more preferably not more than 85%, and still more preferably not more than 80%.

The electric resistance welded steel tube according to aspects of the present invention is such that the depth of a decarburized layer on the tube inner surface is not more than 120 μm from the surface in wall thickness direction, the surface roughness Ra of the tube inner surface in circumferential direction is 0.01 to 5.0 μm, and less wrinkles are present on the tube inner surface. This thin electric resistance welded steel tube can be prevented from cracking on the inner surface of the tube after the tube is formed into a stabilizer shape and is quenched and tempered, thus attaining enhanced fatigue resistance. In the electric resistance welded steel tube according to aspects of the present invention, it is needless to mention that the tube outer surface is shot blasted to harden the outer surface and impart residual compressive stress.

The electric resistance welded steel tube according to aspects of the present invention, having a chemical composition described hereinabove, is a high-strength thin electric resistance welded steel tube which has a hardness expressed in Vickers hardness of not less than 450 HV and less than 550 HV as measured after the steel tube is formed into a stabilizer and is subjected to quenching and tempering treatment, and which also exhibits excellent fatigue resistance after the steel tube is formed into a stabilizer and is subjected to quenching and tempering treatment.

In the quenching and tempering treatment according to aspects of the present invention, the steel tube is heated to a quenching heating temperature of 850 to 1000° C. and is then rapidly cooled by being soaked into a coolant such as water or quenching oil, and the steel tube resulting from the quenching treatment is tempered at a tempering temperature for a holding time which are selected appropriately to attain the high strength (Vickers hardness HV) described above, the tempering being followed by air cooling.

If the quenching heating temperature is below 850° C., where the wall thickness of the stabilizer is large, the whole material may not be hardened uniformly. If the quenching heating temperature is above 1000° C., the surface tends to be decarburized and the target quench hardness according to aspects of the present invention may not be obtained. The quenching heating temperature is preferably not less than 860° C. and not more than 980° C.

The tempering temperature is so selected that the high strength (Vickers hardness HV) described above will be obtained. If the tempering temperature is below 200° C., the material may be embrittled. If the tempering temperature is above 420° C., the target hardness according to aspects of the present invention may not be obtained. The tempering temperature is more preferably 200 to 420° C. The amount of holding time at the tempering temperature is so selected that the high strength (Vickers hardness HV) described above will be obtained. If the amount of holding time at the tempering temperature is less than 5 minutes, uniform hardness may not be obtained. If the amount of holding time is more than 60 minutes, productivity may be deteriorated. The amount of holding time at the tempering temperature is more preferably not less than 10 minutes and not more than 30 minutes.

In accordance with aspects of the present invention, the upper limit of the Vickers hardness is preferably less than 550 HV. If the Vickers hardness exceeds 550 HV, the risk of delayed fracture may be increased and the material may be embrittled.

Aspects of the present invention will be described in greater detail based on examples.

EXAMPLES

Molten steels having a chemical composition shown in Table 1 were smelted in a converter and were continuously cast into billets. The steels thus obtained were subjected to a heating process in which the steel was heated to a heating temperature described in Table 2, a hot rolling process in which the steel was hot rolled using a rolling finish temperature described in Table 2 and was coiled at a coiling temperature described in Table 2, a sheet pickling process described in Table 2, and a skin pass rolling process using a rolling reduction ratio shown in Table 2. Hot rolled steel sheets with a sheet thickness described in Table 2 were thus obtained. The sheet pickling process was omitted for some of the steel sheets. The pickling liquid was hydrochloric acid.

Next, the hot rolled steel sheets as steel tube materials were cold formed into a substantially cylindrical open tube by being passed continuously through a plurality of rolls. Next, the circumferential ends of the open tube were pressed together and electric resistance welded together by high-frequency electric resistance welding. Electric resistance welded steel tubes with dimensions and shapes described in Table 3 were thus obtained.

Further, the electric resistance welded steel tubes were subjected to a hot stretch-reducing rolling process in which the steel tube was reheated to a heating temperature described in Table 3 and was stretch-reducing rolled on a hot stretch-reducing mill with a diameter reduction ratio described in Table 3, and were then subjected to a tube pickling process described in Table 3. Product tubes (electric resistance welded steel tubes) with dimensions described in Table 3 were thus manufactured. A tube pickling process was performed for some of the materials. The pickling liquid was sulfuric acid.

Specimens for microstructure observation (the observation face was a cross section perpendicular to the tube axis direction) were sampled from the product tubes (electric resistance welded steel tubes), polished, and analyzed with EPMA to determine the amount of carbon in the vicinity of the tube inner surface. The amount of carbon was measured with respect to a region extending 1 mm in wall thickness direction starting from the tube inner surface. The decarburized layer was identified based on the point where the C content fell below 90% of the average C content of the product tube, thereby determining the depth (μm) of the decarburized layer in wall thickness direction.

Separately, specimens for measurement of tube inner surface roughness were sampled from the product tubes, and were analyzed with a surface roughness meter to determine the surface roughness of the tube inner surface in circumferential direction. In the surface roughness measurement, the surface roughness Ra (μm) of the tube inner surface in circumferential direction was measured in accordance with JIS B 0601-2001.

Separately, JIS No. 11 specimens were sampled from the product tubes so that the specimens could be pulled in the tube axis direction. A tensile test was carried out in accordance with JIS Z 2241 to determine tensile characteristics (yield ratio (YR:YR=YS/TS×100(%) where YS: yield strength and TS: tensile strength)).

Further, test pieces (test tubes) were sampled from the product tubes and were formed into shapes simulating stabilizer production. Thereafter, the test tubes were heat treated (quenched and tempered) under conditions described in Table 3.

In the quenching treatment, the test tube was conductively heated so that the outer surface of the steel tube would have a quenching heating temperature described in Table 3, and was thereafter soaked into a Water tank. After the quenching treatment, the test tube was tempered by being held at a temperature described in Table 3 for 20 minutes.

Hardness measurement specimens were sampled from the heat-treated test pieces (test tubes). A face (C section) perpendicular to the tube axis direction was polished and analyzed to measure hardness. Vickers hardness was measured in accordance with JIS Z 2244 at 0.1 mm pitches in the wall thickness direction starting from the tube inner surface. In the hardness measurement, Vickers hardness HV0.5 was measured using a Vickers hardness meter (load: 500 gf (4.9 N)). The values of hardness obtained were arithmetically averaged to give the hardness (average hardness) of the steel tube after heat treatment.

Separately, fatigue specimens were sampled from the heat-treated test pieces (test tubes) and were subjected to a torsional fatigue test under completely reversed stress in accordance with JIS Z 2273. The fatigue strength (MPa) after $10^6$ times of stress application was determined.

The results are described in Table 4.

TABLE 1

| Steel No. | Chemical composition (mass %) | | | | | | | | | | | | | | |
|---|---|---|---|---|---|---|---|---|---|---|---|---|---|---|---|
| | C | Si | Mn | P | S | Al | Cr | Ti | B | Ca | N | Cu, Ni | Nb, W, V | REM | Remarks |
| A | 0.26 | 0.19 | 0.5 | 0.01 | 0.002 | 0.03 | 0.30 | 0.015 | 0.002 | 0.0002 | 0.003 | — | — | — | Example |
| B | 0.26 | 0.19 | 1.3 | 0.01 | 0.002 | 0.03 | 0.15 | 0.035 | 0.002 | 0.0020 | 0.003 | — | — | — | Example |
| C | 0.26 | 0.19 | 1.3 | 0.01 | 0.002 | 0.03 | 0.15 | 0.035 | 0.002 | 0.0020 | 0.003 | Cu: 0.2 | — | — | Example |
| D | 0.34 | 0.19 | 1.4 | 0.01 | 0.002 | 0.03 | 0.15 | 0.035 | 0.002 | 0.0020 | 0.003 | — | — | — | Example |
| E | 0.34 | 0.19 | 1.4 | 0.01 | 0.002 | 0.03 | 0.15 | 0.035 | 0.002 | 0.0020 | 0.003 | Ni: 0.2 | Nb: 0.015 | — | Example |
| F | 0.34 | 0.19 | 1.4 | 0.01 | 0.002 | 0.03 | 0.15 | 0.035 | 0.002 | 0.0020 | 0.003 | — | W: 0.03, V: 0.1 | 0.002 | Example |
| G | 0.15 | 0.19 | 0.6 | 0.01 | 0.002 | 0.03 | 0.15 | 0.035 | 0.002 | 0.0020 | 0.003 | — | — | — | Comparative Example |
| H | 0.34 | 0.19 | 0.02 | 0.01 | 0.002 | 0.03 | — | 0.035 | 0.002 | 0.0020 | 0.003 | — | — | — | Comparative Example |
| I | 0.26 | 0.19 | 1.3 | 0.01 | 0.002 | 0.03 | 0.10 | — | 0.002 | 0.0020 | 0.003 | — | — | — | Comparative Example |

TABLE 2

| Steel sheet No. | Steel No. | Heating process Heating temperature (° C.) | Hot rolling process Rolling finish temperature (° C.) | Hot rolling process Coiling temperature (° C.) | Sheet pickling process Yes/No | Skin pass Rolling reduction ratio (%) | Sheet thickness (mm) | Remarks |
|---|---|---|---|---|---|---|---|---|
| A1 | A | 1200 | 840 | 550 | No | 0.7 | 5.0 | Example |
| B1 | B | 1150 | 850 | 500 | No | 0.7 | 5.0 | Example |
| C1 | C | 1250 | 860 | 550 | Yes | 0.7 | 5.0 | Example |
| D1 | D | 1150 | 840 | 600 | No | 0.7 | 5.0 | Example |
| E1 | E | 1200 | 830 | 580 | No | 0.7 | 5.0 | Example |
| F1 | F | 1180 | 850 | 520 | Yes | 0.7 | 5.0 | Example |
| G1 | G | 1190 | 820 | 550 | No | 0.7 | 5.0 | Comparative Example |
| H1 | H | 1200 | 840 | 540 | No | 0.7 | 5.0 | Comparative Example |
| I1 | I | 1150 | 830 | 510 | No | 0.7 | 5.0 | Comparative Example |
| A2 | A | 1310 | 830 | 550 | No | 0.7 | 5.0 | Comparative Example |
| A3 | A | 1200 | 960 | 550 | No | 0.7 | 5.0 | Comparative Example |
| A4 | A | 1200 | 850 | 700 | No | 0.7 | 5.0 | Comparative Example |
| A5 | A | 1200 | 850 | 550 | No | 0.1 | 5.0 | Comparative Example |

TABLE 3

| Steel tube No. | Steel sheet No. | Steel No. | Electric resistance welded steel tube Outer diameter φ × Wall thickness (mm) | Hot stretch-reducing rolling process Reheating temp. (° C.) | Hot stretch-reducing rolling process Diameter reduction (%) | Hot stretch-reducing rolling process Rolling finish temp. (° C.) | Hot stretch-reducing rolling process Tube pickling Yes/No | Product tube Outer diameter φ × Wall thickness (mm) | Product tube t/D ** | Heat treatment Quench heating temp. (° C.) | Heat treatment Cooling | Heat treatment Tempering temp. (° C.) | Remarks |
|---|---|---|---|---|---|---|---|---|---|---|---|---|---|
| 1 | A1 | A | 89.1φ × 4.5 | 950 | 71 | 800 | No | 25.4φ × 4.0 | 0.16 | 950 | Water cooling | 300 | Example |
| 2 | B1 | B | 89.1φ × 4.5 | 950 | 71 | 800 | No | 25.4φ × 4.0 | 0.16 | 950 | Water cooling | 280 | Example |
| 3 | C1 | C | 89.1φ × 4.5 | 950 | 71 | 800 | No | 25.4φ × 4.0 | 0.16 | 950 | Water cooling | 250 | Example |
| 4 | D1 | D | 89.1φ × 4.5 | 950 | 71 | 800 | No | 25.4φ × 4.0 | 0.16 | 950 | Water cooling | 300 | Example |
| 5 | E1 | E | 89.1φ × 4.5 | 950 | 71 | 800 | No | 25.4φ × 4.0 | 0.16 | 950 | Water cooling | 280 | Example |
| 6 | F1 | F | 89.1φ × 4.5 | 950 | 71 | 800 | Yes | 25.4φ × 4.0 | 0.16 | 950 | Water cooling | 250 | Example |
| 7 | G1 | G | 89.1φ × 4.5 | 950 | 71 | 800 | No | 25.4φ × 4.0 | 0.16 | 950 | Water cooling | 280 | Comparative Example |

TABLE 3-continued

| | | | Electric resistance welded steel tube | Hot stretch-reducing rolling process | | | | Product tube | | Heat treatment | | | |
|---|---|---|---|---|---|---|---|---|---|---|---|---|---|
| Steel tube No. | Steel sheet No. | Steel No. | Outer diameter φ × Wall thickness (mm) | Re-heating temp. (° C.) | Diameter reduction (%) | Rolling finish temp. (° C.) | Tube pickling Yes/No | Outer diameter φ × Wall thickness (mm) | t/D ** | Quench heating temp. (° C.) | Cooling | Tempering temp. (° C.) | Remarks |
| 8 | H1 | H | 89.1φ × 4.5 | 950 | 71 | 800 | No | 25.4φ × 4.0 | 0.16 | 950 | Water cooling | 280 | Comparative Example |
| 9 | I1 | I | 89.1φ × 4.5 | 950 | 71 | 800 | No | 25.4φ × 4.0 | 0.16 | 950 | Water cooling | 280 | Comparative Example |
| 10 | A2 | A | 89.1φ × 4.5 | 950 | 71 | 800 | No | 25.4φ × 4.0 | 0.16 | 950 | Water cooling | 300 | Comparative Example |
| 11 | A3 | A | 89.1φ × 4.5 | 950 | 71 | 800 | No | 25.4φ × 4.0 | 0.16 | 950 | Water cooling | 300 | Comparative Example |
| 12 | A4 | A | 89.1φ × 4.5 | 950 | 71 | 800 | No | 25.4φ × 4.0 | 0.16 | 950 | Water cooling | 300 | Comparative Example |
| 13 | A5 | A | 89.1φ × 4.5 | 950 | 71 | 800 | No | 25.4φ × 4.0 | 0.16 | 950 | Water cooling | 300 | Comparative Example |
| 14 | A1 | A | 89.1φ × 4.5 | 1110 | 71 | 800 | No | 25.4φ × 4.0 | 0.16 | 950 | Water cooling | 300 | Comparative Example |
| 15 | D1 | D | 89.1φ × 4.5 | 980 | 71 | 900 | No | 25.4φ × 4.0 | 0.16 | 950 | Water cooling | 300 | Comparative Example |
| 16 | D1 | D | 89.1φ × 4.5 | 950 | 71 | 830 | No | 25.4φ × 4.0 | 0.16 | 950 | Water cooling | 450 | Comparative Example |
| 17 | A1 | A | 89.1φ × 4.5 | 950 | 36 | 800 | No | 57.0φ × 4.5 | 0.08 | 950 | Water cooling | 300 | Example |
| 18 | A1 | A | 89.1φ × 4.5 | 950 | 36 | 900 | No | 57.0φ × 4.5 | 0.08 | 950 | Water cooling | 300 | Comparative Example |

** t: Wall thickness, D: Outer diameter

TABLE 4

| | | | Product tube | | | Characteristics after heat treatment | | |
|---|---|---|---|---|---|---|---|---|
| Steel tube No. | Steel sheet No. | Steel No. | Depth of decarburized layer (μm) | Surface roughness Ra* (μm) | Yield ratio (%) | Average hardness HV0.5 | Fatigue resistance Fatigue strength (MPa) | Remarks |
| 1 | A1 | A | — | 1.1 | 68 | 460 | 480 | Inventive Example |
| 2 | B1 | B | 10 | 1.2 | 70 | 480 | 490 | Inventive Example |
| 3 | C1 | C | 15 | 1.0 | 71 | 500 | 520 | Inventive Example |
| 4 | D1 | D | — | 1.5 | 70 | 480 | 500 | Inventive Example |
| 5 | E1 | E | — | 1.0 | 66 | 500 | 510 | Inventive Example |
| 6 | F1 | F | 10 | 1.2 | 68 | 520 | 530 | Inventive Example |
| 7 | G1 | G | 20 | 1.0 | 69 | 380 | 380 | Comparative Example |
| 8 | H1 | H | 10 | 1.0 | 70 | 420 | 430 | Comparative Example |
| 9 | I1 | I | 10 | 1.3 | 65 | 420 | 430 | Comparative Example |
| 10 | A2 | A | 150 | 7.0 | 70 | 450 | 320 | Comparative Example |
| 11 | A3 | A | 140 | 7.2 | 66 | 440 | 430 | Comparative Example |
| 12 | A4 | A | 140 | 6.5 | 68 | 440 | 430 | Comparative Example |
| 13 | A5 | A | 25 | 5.6 | 68 | 440 | 440 | Comparative Example |
| 14 | A1 | A | 150 | 7.0 | 66 | 450 | 410 | Comparative Example |
| 15 | D1 | D | 160 | 6.8 | 60 | 450 | 450 | Comparative Example |
| 16 | D1 | D | 150 | 3.0 | 67 | 340 | 320 | Comparative Example |
| 17 | A1 | A | 10 | 1.0 | 67 | 460 | 490 | Inventive Example |
| 18 | A1 | A | 150 | 3.0 | 60 | 340 | 320 | Comparative Example |

*Surface roughness of tube inner surface in circumferential direction

The electric resistance welded steel tubes of Inventive Examples attained a high strength (a high hardness) and their hardnesses after quenching and tempering treatment were not less than 450 HV. These electric resistance welded steel tubes also exhibited excellent fatigue resistance with the fatigue strength in a torsional fatigue test under completely reversed stress being not less than 450 MPa. Thus, the inventive electric resistance welded steel tubes were shown to be suited for use as thin hollow stabilizers.

In contrast, the electric resistance welded steel tubes of Comparative Examples; which were outside the range of the present invention, had a hardness after quenching and tempering treatment of less than 450 HV and failed to achieve the desired high strength (high hardness), or exhibited low fatigue resistance with the fatigue strength being less than 450 MPa.

The invention claimed is:

1. A method for manufacturing an electric resistance welded steel tube for high-strength thin hollow stabilizers, comprising heating, hot rolling and skin pass rolling processes where a steel is formed into a hot rolled sheet, a tube making process by an electric resistance welding is applied to the hot rolled sheet as a steel tube material into an electric resistance welded steel tube, and a hot stretch-reducing rolling process is applied to the reheated and hot stretch-reducing rolled electric resistance welded steel tube, making a product tube having a reduced diameter, wherein the steel has a chemical composition comprising, in mass %:
C: 0.20 to 0.40%, Si: 0.1 to 1.0%,
Mn: 0.1 to 2.0%, P: not more than 0.1%,
S: not more than 0.01%, Al: 0.01 to 0.10%,
Cr: 0.01 to 1.0%, Ti: 0.01 to 0.05%,
B: 0.0005 to 0.0050%, Ca: 0.0001 to 0.0050%, and
N: not more than 0.010%, the balance being Fe and inevitable impurities, the heating process for the steel comprises heating the steel to a heating temperature in the range of 1000 to 1300° C., the hot rolling process comprises hot rolling the steel under conditions where the rolling finish temperature is 750 to 950° C., cooling the steel sheet, and coiling the steel sheet into a coil at a coiling temperature of 500 to 650° C., the skin pass rolling process comprises skin pass rolling the steel sheet with a rolling reduction ratio of not less than 0.3%, the hot stretch-reducing rolling process comprises reheating the electric resistance welded steel tube to a heating temperature of 800 to 1100° C., and hot stretch-reducing rolling the electric resistance welded steel tube to a reduced diameter under conditions where the rolling finish temperature is not more than 850° C. and the cumulative diameter reduction ratio is not more than 75%, the product tube has a depth of a decarburized layer in wall thickness direction on the tube inner surface of not more than 120 μm from the surface, the product tube has a surface roughness Ra of the tube inner surface of 0.01 to 5.0 μm, the product tube has a yield ratio of not less than 65%, the product tube has a hardness expressed in Vickers hardness of not less than 450 HV as measured after the steel tube is formed into a stabilizer and is subjected to quenching and tempering treatment, the quenching comprising heating the steel tube to a quenching heating temperature of 850 to 1000° C. and then rapidly cooling the steel tube by soaking in a coolant, the tempering treatment comprising tempering at a tempering temperature of 200 to 420° C. for a holding time of not less than 10 minutes and not more than 30 minutes, and the product tube has a wall thickness t of not more than 6 mm and a ratio t/D of the wall thickness t (mm) to the outer diameter D (mm) of not more than 0.2 and exhibits a fatigue strength after $10^6$ times of stress application in a torsional fatigue test under completely reversed stress in accordance with Japanese Industrial Standard (JIS) Z 2273 of not less than 450 MPa after being formed into a stabilizer and subjected to the quenching and tempering treatment.

2. The method for manufacturing an electric resistance welded steel tube for high-strength thin hollow stabilizers according to claim 1, wherein the hardness expressed in Vickers hardness is less than 550 HV as measured after the steel tube is formed into a stabilizer and is subjected to the quenching and tempering treatment.

3. The method for manufacturing an electric resistance welded steel tube for high-strength thin hollow stabilizers according to claim 1, wherein the chemical composition further comprises, in mass %, at least one selected from:
Cu: not more than 1%, Ni: not more than 1%, Nb: not more than 0.05%, W: not more than 0.05%, V: not more than 0.5%, and REM: not more than 0.02%.

4. The method for manufacturing an electric resistance welded steel tube for high-strength thin hollow stabilizers according to claim 2, wherein the chemical composition further comprises, in mass %, at least one selected from:
Cu: not more than 1%, Ni: not more than 1%, Nb: not more than 0.05%, W: not more than 0.05%, V: not more than 0.5%, and REM: not more than 0.02%.

5. An electric resistance welded steel tube for high-strength thin hollow stabilizers manufactured by hot stretch-reducing rolling an electric resistance welded steel tube of a hot rolled steel sheet, wherein the electric resistance welded steel tube has a chemical composition comprising, in mass %:
C: 0.20 to 0.40%, Si: 0.1 to 1.0%,
Mn: 0.1 to 2.0%, P: not more than 0.1%,
S: not more than 0.01%, Al: 0.01 to 0.10%,
Cr: 0.01 to 1.0%, Ti: 0.01 to 0.05%,
B: 0.0005 to 0.0050%, Ca: 0.0001 to 0.0050%, and
N: not more than 0.010%, the balance being Fe and inevitable impurities, the depth of a decarburized layer in wall thickness direction on the tube inner surface is not more than 120 μm from the surface, the surface roughness Ra of the tube inner surface is 0.01 to 5.0 μm, the yield ratio is not less than 65%, the hardness expressed in Vickers hardness is not less than 450 HV as measured after the steel tube is formed into a stabilizer and is subjected to quenching and tempering treatment, the quenching comprising heating the steel tube to a quenching heating temperature of 850 to 1000° C. and then rapidly cooling the steel tube by soaking in a coolant, the tempering treatment comprising tempering at a tempering temperature of 200 to 420° C. for a holding time of not less than 10 minutes and not more than 30 minutes, and the electric resistance welded steel tube has a wall thickness t of not more than 6 mm and a ratio t/D of the wall thickness t (mm) to the outer diameter D (mm) of not more than 0.2 and exhibits a fatigue strength after $10^6$ times of stress application in a torsional fatigue test under completely reversed stress in accordance with Japanese Industrial Standard (JIS) Z 2273 of not less than 450 MPa after being formed into a stabilizer and subjected to the quenching and tempering treatment.

6. The electric resistance welded steel tube for high-strength thin hollow stabilizers according to claim 5, wherein the hardness expressed in Vickers hardness is less than 550 HV as measured after the steel tube is formed into a stabilizer and is subjected to the quenching and tempering treatment.

7. The electric resistance welded steel tube for high-strength thin hollow stabilizers according to claim 5, wherein the chemical composition further comprises, in mass %, at least one selected from:
Cu: not more than 1%, Ni: not more than 1%, Nb: not more than 0.05%, W: not more than 0.05%, V: not more than 0.5%, and REM: not more than 0.02%.

8. The electric resistance welded steel tube for high-strength thin hollow stabilizers according to claim 6, wherein the chemical composition further comprises, in mass %, at least one selected from:

Cu: not more than 1%, Ni: not more than 1%, Nb: not more than 0.05%, W: not more than 0.05%, V: not more than 0.5%, and REM: not more than 0.02%.

* * * * *